(12) United States Patent
Tilbor

(10) Patent No.: US 6,476,529 B1
(45) Date of Patent: Nov. 5, 2002

(54) GYROSCOPIC STABILIZATION AND POWER MANAGEMENT SYSTEM

(76) Inventor: Neil Tilbor, 4707 Van Kleeck Dr., New Smyrna Beach, FL (US) 32169

( * ) Notice: Subject to any disclaimer, the term of this patent is extended or adjusted under 35 U.S.C. 154(b) by 0 days.

(21) Appl. No.: 09/774,263

(22) Filed: Jan. 31, 2001

Related U.S. Application Data

(60) Provisional application No. 60/179,872, filed on Feb. 2, 2000.

(51) Int. Cl.[7] .............................. H02K 7/02; H02K 7/10
(52) U.S. Cl. ...................... 310/74; 310/75 R; 310/78; 310/112
(58) Field of Search ...................... 310/74, 112, 75 R, 310/78; 180/65.1, 65.6

(56) References Cited

U.S. PATENT DOCUMENTS

| | | | | |
|---|---|---|---|---|
| 2,422,120 A | * | 6/1947 | Noble | 310/74 |
| 3,497,026 A | * | 2/1970 | Calvert | 180/165 |
| 4,229,728 A | * | 10/1980 | Tremba | 200/61.22 |
| 5,427,194 A | * | 6/1995 | Miller | 180/165 |
| 5,760,506 A | * | 6/1998 | Ahlstrom et al. | 310/74 |

* cited by examiner

*Primary Examiner*—Burton S. Mullins
(74) *Attorney, Agent, or Firm*—Keusey, Tutunjian & Bitetto, P.C.

(57) ABSTRACT

A gyroscopic stabilization and power management system that may be incorporated into a plurality of different devices. The system includes a flywheel, a motor centrally disposed within the flywheel such that the motor housing and flywheel rotate together when the motor shaft is fixed against rotation. A plurality of batteries or other power sources are radially disposed and integrated into the flywheel. The batteries increase the overall mass of the flywheel, thereby increasing its gyroscopic operation during rotation, in addition to providing power to the motor for operation. A printed circuit board connected to the flywheel handles all electronic controls both internal and external to the flywheel, including, for example, power control, speed control, electrical/mechanical power management, dynamic braking and radio controls.

13 Claims, 1 Drawing Sheet

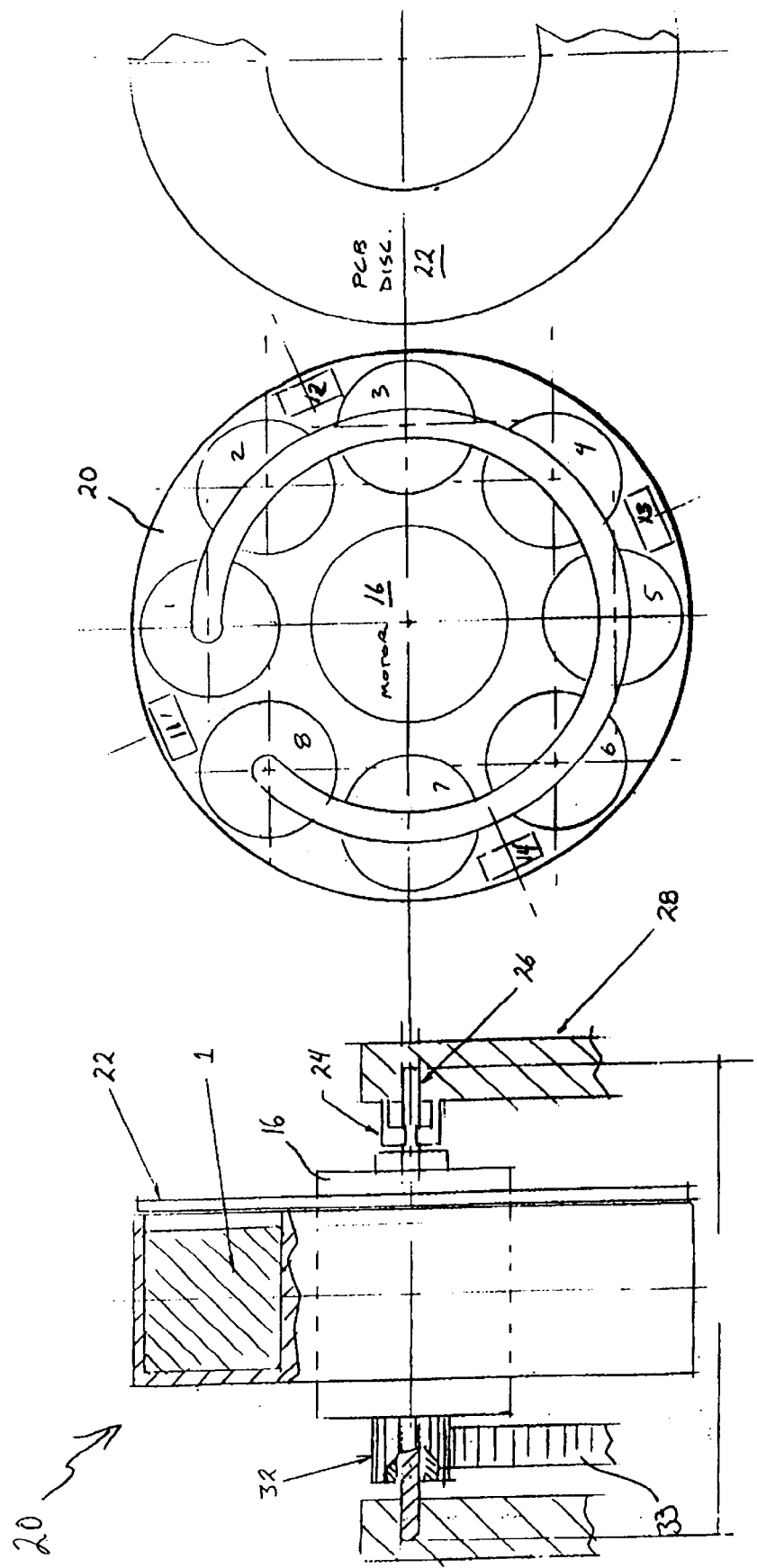

GYROSCOPIC STABILIZATION AND POWER MANAGEMENT SYSTEM

This application claims the benefit of provisional application No. 60/179,872 filed on Feb. 2, 2000

BACKGROUND OF THE INVENTION

1. Field of the Invention

The present invention relates to gyroscopes, and more particularly to a device for providing gyroscopic stabilization and power management functions.

2. Description of the Prior Art

Flywheels have long been used to store energy, provide gyroscopic stabilization and to communicate positional change information to electronic and electromechanical stabilization systems in a wide variety of aeronautical, navigational, toy and novelty devices. Examples of such devices are powered and radio controlled miniature vehicles such as cars and motorcycles.

In any vehicle or device where: 1) it is necessary or desirable to have the highest possible level of gyroscopic stabilization; 2) power supply is limited; 3) the power to weight ratio is critical for attaining a desired level of performance; 4) the proportion of the flywheel mass to total mass is critical in order to achieve the desired high level of gyroscopic effect on the device; and 5) a high energy output and/or maximum performance is desired, it would be desirable to have a gyroscope system having at least some of the following features. 1) The flywheel is as heavy as possible and spins as fast as possible; 2) power is stored, managed and used efficiently; 3) the overall weight of the device is minimized while the power system capacity is maximized; 4) a large percentage of the necessary total mass of the device, including the power system, is incorporated into the flywheel mass, even as it is removed from the non-flywheel portions of the device; and 5) power can be stored as kinetic mechanical energy that may be used all at once or proportionally through clutches and transmissions to obtain very high torque or high rpm power output to the device or to the operating medium of the vehicle.

SUMMARY OF THE INVENTION

It is therefore an object of the invention to provide a gyroscope apparatus that achieves all of the aforementioned desirable features.

It is another object of the invention to provide an apparatus that provides gyroscopic stabilization and power management functions to a wide variety of devices in accordance with a particular application.

These and other objects of the invention are achieved by providing a gyroscope stabilizer/power management system where the electric motor is disposed at the center of the flywheel with the armature of the motor being fixed from rotation. The integrated electric motor with fixed armature may include rotating field magnets and a brush assembly. In addition, a plurality of batteries (rechargeable or replaceable) are radially arranged within the outer circumference of the flywheel.

A printed circuit board (PCB) is connected to and part of the flywheel and includes electronics that may be designed to incorporate some or all of the power control, speed control power management, dynamic braking, clutch and transmission controls, radio control receiver, microprocessor, micro-controller, charging and intra-device contactless communications schemes.

An external commutator, connector or any known wireless method of communicating flywheel, vehicle or device control information may also be included. In addition, the flywheel can also include a system for electrically connecting external battery recharging systems and for tapping electrical power output from the flywheel which can be used to power device systems not contained within the flywheel itself.

The gyroscopic stabilization/power management system enables the storage of power from the flywheel's internal power and drive systems as kinetic mechanical energy which can be converted back to electrical energy for other use by virtue of the integrated electric motor functioning as a generator during non-powered coast-down of the flywheel. An example of such use may be charging of the onboard batteries.

In accordance with another embodiment, the flywheel may also be used as a rotating stator to induce an electrical current in a fixed field coil with ferrous core adjacent to the flywheel. Thus, the spinning permanent magnets of the integrated electric motor (or possible separate additional permanent magnets mounted on the flywheel) will induce an electrical flow of current in the coil. The current generated in this manner may be used to help recharge the batteries integrated into the flywheel, or may be used to power other devices or systems external to the flywheel.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numeral denote similar components throughout the views:

FIG. 1 is a side view in partial cross-section of gyroscope stabilization/power management system according to an embodiment of the invention; and FIG. 2 is a front partially exploded view of the gyroscope stabilization/power management system according to an embodiment of the invention.

DETAILED DESCRIPTION OF PREFERRED EMBODIMENTS

Referring to FIGS. 1 and 2, there is shown a flywheel 20 having a motor 16 centrally disposed and mounted therein such that the shaft or armature 26 of motor 16 is the central axis of the flywheel. According to a preferred embodiment, flywheel 20 contains a plurality of battery cells (rechargeable or replaceable) 1–8 radially arranged within the outer circumference of the flywheel. By disposing the battery cells 1–8 within flywheel 20 in this manner, the overall mass of the flywheel is increased which enables the flywheel to achieve a gyro effect without requiring the addition of any "dead weight". In addition, the disposition of the batteries within flywheel 20 provides onboard power management because the power driving the motor 16 is coming from within the flywheel. This configuration provides more efficient power management because there are no friction losses and/or commutator losses which would be otherwise associated with the providing of power to the integrated motor for spinning or actuation of the same.

By adding the batteries 1–8 to the flywheel mass, the mass of the device in which the flywheel is disposed can be reduced, thus increasing the proportion of flywheel mass to the total mass of the device which is useful in obtaining a desired high level of gyroscopic effect. One of ordinary skill will recognize that the number of batteries contained within flywheel 20 may be varied provided they are equally and radially distributed on the flywheel.

As shown, motor 16 is integrated within flywheel 20 and is arranged within a fixed stantion 28 of the device in which flywheel 20 is mounted. In this embodiment, the motor 16 is arranged within stantion 28 such that the armature of the motor 16 or shaft 26 is fixed against rotation. In an alternative embodiment, the shaft 26 is adjustably released from its fixed mounting to provide a variable mechanical torque output of the flywheel. By way of example, when the flywheel reaches a predetermined revolution speed, the shaft may be selectively uncoupled from its fixed mounting and clutched in a controlled manner (e.g., by dynamic braking) in order to provide a variable mechanical torque output at the shaft. FIG. 1 shows a pinion gear 32 mounted to the housing of motor 16 which is adapted to engage a gear 33 to translate the torque generated at the shaft when the shaft is selectively uncoupled from its fixed mounting.

A printed circuit board (PCB) is part of flywheel 20 and incorporates all or some of the electronic circuitry responsible for power control, speed control, electrical and/or mechanical power management (depending on the particular application and mode of operation of the flywheel), dynamic braking, radio control receiver, microprocessor, microcontroller, charging and intra-contactless communications schemes. The PCB 22 may also provide an option to introduce electronic dynamic braking the flywheel via motor 16. The introduction of electronic dynamic braking to motor 16 would significantly increase the resulting torque at the motor armature. Since PCB 22 is part of flywheel 20 and therefore rotates therewith, the electrical connections between PCB and batteries 1–8 are any suitable known method or device for making electrical connections. PCB 22 will also provide the necessary control signals for the previously mentioned selective and adjustable mechanical torque output generated at the shaft 26 when the shaft is selectively released from its rotationally fixed position.

As shown in FIG. 1, an external commutator or connector 24 is provided for communicating flywheel vehicle or device control information, and which may also be used to electrically connect external recharging systems and tap flywheel electrical power output which can be used to power device systems not located within the flywheel itself A wireless alternative for tapping power may also be incorporated into the system. An example of such wireless alternative would be when motor 16 acts as a stator in a larger generator system such that the rotating magnets in motor 16 can be positioned adjacent a field coil (not shown) to induce a current and thereby a low electrical power output of the field coil. Alternative electrical connections method include brush systems (either fixed or retractable) with corresponding contacts to enable the transmission of electrical signals to and from the flywheel (e.g., PCB).

In operation, the shaft (or armature) 26 of motor 16 is mounted in a fixed, non-rotating position. Thus, when the motor is actuated, the motor itself and flywheel begin to rotate about the fixed shaft 26. In this operation, the power from the flywheel's internal power and drive systems is stored in the flywheel as kinetic mechanical energy. This mechanical energy may subsequently be converted back to electrical energy by virtue of the fact that the integrated electric motor functions as a generator during non-powered coast-down of the flywheel. This electrical energy could be used, for example, in battery recharging or other applications internal or external to the flywheel.

As briefly mentioned previously, in another embodiment, the flywheel 20 may also be used as a rotating stator to induce an electrical current in a field coil with a ferrous core adjacent the flywheel, where the spinning magnets of the integral motor 16, or separate additional permanent magnets disposed on the flywheel, will induce an electrical flow of current through the fixed coil. This additional power can be used to help recharge the batteries integrated into the flywheel, or to power systems external to the flywheel.

With the flywheel design of the present invention, large amounts of torque can be generated at the motor housing and central shaft 26 in the form of mechanical energy stored in the relatively heavy (e.g., 50% of the overall weight of the device), relatively high speed (10,000 rpm) of the gyroscopic stabilization/power management system, due to the power accumulation and/or torque multiplying effect of the flywheel. However, one of ordinary skill will recognize that the revolution speed of the flywheel may be varied depending on the desired application. For example, the revolution speed can be 100–100,000 revolutions per minute (rpm).

The gyroscopic flywheel/power management system may be used in many different applications. The present flywheel design provides dual modes of operation of the flywheel and any other external systems related to it. The controlled application of such energy may be provided electronically via the PCB or mechanically via the controlled and adjustable releasing of the motor shaft via clutch/transmission elements. One of ordinary skill will recognize that the electrical or mechanical energy generated by the flywheel can be converted into other forms of energy and back again if needed and as desired for a particular application.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A gyroscopic stabilization and power management system comprising:

a flywheel having an axis of rotation and a mass;

a motor having a housing and a shaft, said motor being centrally disposed within said flywheel such that said shaft is coaxially aligned with said axis of rotation of said flywheel;

a first gear connected to said motor housing and adapted to rotate with said motor housing; and a clutch mechanism operatively connected to said first gear and adapted to selectively draw mechanical energy from the rotating motor housing.

2. The system according to claim 1, further comprising securing means adapted to receive and mount said motor shaft in a fixed position, wherein said motor housing and flywheel cooperatively rotate about said fixed motor shaft.

3. The system according to claim 2, wherein said flywheel further comprises power means radially disposed around said flywheel and electrically connected to said motor, wherein said power means operable to provide power to said motor and increase the mass of said flywheel.

4. The system according to claim 3, wherein said power means comprises a plurality of batteries equally and evenly distributed around said flywheel such that said flywheel rotates in a balanced manner.

5. The system according to claim 2, wherein said securing means comprises a stanchion.

6. The system according to claim 5, wherein said stanchion selectively releases said motor shaft to vary mechanical torque output of the flywheel.

7. The system according to claim 1, further comprising electrical means operatively engaged with said motor shaft for tapping electrical power generated by the rotating flywheel.

8. The system according to claim 7, wherein said electrical means comprises a commutator, said commutator being capable of communicating position and control information to a user.

9. A gyroscopic stabilization and power management system comprising:

a flywheel having an axis of rotation and a mass;

a motor having a housing and a shaft, said motor being centrally disposed within said flywheel such that said shaft is coaxially aligned with said axis of rotation of said flywheel;

power means radially disposed around and integrated into said flywheel, said power means operable to provide power to said motor and increase the mass of said flywheel;

securing means adapted to receive and mount said motor shaft in a fixed position, wherein said motor housing and flywheel cooperatively rotate about said fixed motor shaft;

first gear connected to said motor housing and adapted to rotate with said motor housing; and a clutch mechanism operatively connected to said first gear and adapted to selectively draw mechanical energy from the rotating motor housing.

10. The system according to claim 9, wherein said securing means comprises torque adjustment means for selectively adjusting a mechanical torque output of said flywheel.

11. The system according to claim 10, wherein said adjustment means comprises selectively realeasing said motor shaft from said fixed position, wherein selective releasing of said fixed motor shaft varies the mechanical torque output of said flywheel.

12. The system according to claim 9, further comprising electrical means operatively engaged with said motor shaft for selectively tapping electrical power generated by the rotating flywheel.

13. The system according to claim 12, wherein said electrical means comprises commutator, said commutator communicating position and control information to a user.

* * * * *

UNITED STATES PATENT AND TRADEMARK OFFICE
CERTIFICATE OF CORRECTION

PATENT NO.   : 6,476,529 B1
DATED        : November 5, 2002
INVENTOR(S)  : Neil Tilbor It is certified that error appears in the above-identified patent and that said Letters Patent is hereby corrected as shown below:

Column 6,
Line 31, delete "commulator" and substitute -- commutator --

Signed and Sealed this

Twenty-fifth Day of February, 2003

JAMES E. ROGAN
*Director of the United States Patent and Trademark Office*